United States Patent [19]

Baranyi et al.

[11] 3,875,512

[45] Apr. 1, 1975

[54] METHOD AND CIRCUIT ARRANGEMENT FOR MEASURING AM TO PM CONVERSION

[75] Inventors: Andras Baranyi; Tamas Sarkany, both of Budapest, Hungary

[73] Assignee: Hewlett-Packard Limited, West Lothian, Scotland

[22] Filed: Oct. 3, 1973

[21] Appl. No.: 402,926

[30] Foreign Application Priority Data

Oct. 11, 1972 Hungary .......................... TA 1214
Jan. 1, 1973 United Kingdom.......... 00825/73

[52] U.S. Cl................. 325/67, 324/58 A, 325/363, 328/163

[51] Int. Cl......................................... G01r 15/00

[58] Field of Search ............ 325/67, 133, 134, 363, 325/476; 324/57 DE, 58 A; 179/15 BT, 175.3; 328/162, 163

[56] References Cited

UNITED STATES PATENTS 3,437,921 4/1969 Custer et al. ....................... 325/67

*Primary Examiner*—Howard W. Britton
*Assistant Examiner*—Marc E. Bookbinder
*Attorney, Agent, or Firm*—A. C. Smith

[57] ABSTRACT

An improved method and circuit arrangement for measuring AM-to-PM conversion utilizes a phase modulated carrier generator, a two-port network having a linear delay or amplitude characteristic, a two-position switching circuit and a phase demodulator, and is especially related to the measurement of microwave radio relay links.

12 Claims, 4 Drawing Figures

METHOD AND CIRCUIT ARRANGEMENT FOR MEASURING AM TO PM CONVERSION

BACKGROUND OF THE INVENTION

In recent years, the study of AM-to-PM conversion as an additional intermodulation noise source has gained in importance because of the increase in the channel capacity of microwave PM systems. It has been recognized that besides the intermodulation noise caused directly by group delay distortions, additional intermodulation noise is caused also by an indirect distortion mechanism, due to AM-to-PM conversion in the PM signal transmission path. (See, for instance, G. J. Garrison, Intermodulation Distortion in Frequency Division Multiplex PM Systems, a Tutorial Summary, IEEE Trans. On Comm. Technology, April 1968, p. 289).

AM-to-PM conversion is a characteristic circuit parameter representing the transformation of a pure amplitude modulated signal (abbreviated AM signal) at the input into an amplitude and phase modulated signal (abbreviated AM+PM signal) at the output. According to definition, AM-to-PM conversion is the ratio of the output signal PM index to the input signal AM index. Thus the measurement of AM-to-PM conversion requires the generation of an amplitude modulated signal and the measurement of the phase modulation index of a signal having both AM and PM modulation.

The growing importance of AM-to-PM conversion has resulted in an interest also in the measurement methods related to this parameter. This is only a recent trend, and presently no AM-to-PM conversion measuring equipment is available commercially, and relatively few methods have been published in the literature.

The methods used in practice may be classified into two groups. Methods falling in the first group utilize spectrum analysis, i.e. frequency domain measurement, and methods in the second group make use of a phase detector, i.e. time domain measurement.

The block diagram of the conversion measurement by the known spectrum method is shown in FIG. 1 (see T. Sárkány, A New Method for Measuring Amplitude Modulation Compression, Proc. IEE, Part B, March 1962, p. 151). The signal of the carrier generator 27 is simultaneously modulated by the signal of the test signal generator 41 in the amplitude modulator 29 and the phase modulator 31. The magnitude of the phase modulation is adjusted by the amplitude control 33 and the phase relative to the amplitude modulation is adjusted by the phase shifter 35 in a way such that the input phase modulation should just cancel the phase modulation originating from the test item 43, i.e. the phase modulation introduced by the AM-to-PM conversion to be measured. The compensation is detected by a spectrum analyzer 37 connected to the test item output, and the magnitude of the phase modulation resulting in this compensation process is read off a calibrated meter 39.

The block-diagram of a conversion measurement set-up using the known phase detector method is shown in FIG. 2. The signal of the carrier generator 45 is modulated in amplitude by the signal of the test generator 47, and this modulated signal is given on the test item 55, the output of which is connected to a phase demodulator 51. This will detect directly the phase modulation originating from the conversion, and the magnitude of this phase modulation, which is proportional to the conversion in the case of a fixed amplitude modulation, is read off the meter 53 connected to the phase demodulator 51.

There exist several versions of the measurement methods according to FIGS. 1 and 2 with minor differences, but all have two shortcomings. Both methods require the realization of extremely pure amplitude modulation which is free from parasitic phase modulation, as the sensitivity of measurement is limited primarily by this unwanted phase modulation. Practical requirements can only be met by elaborate design methods and critical circuit adjustments. A further requirement of both above methods is the precise measurement of very low phase modulation. In the case of the spectrum method, this requires a very sensitive spectrum analyzer. On the other hand, the phase detector method requires an extremely sensitive phase demodulator, with the additional constraint that the phase indication should be highly insensitive to amplitude modulation. These requirements are likewise met only by circuits with considerable realization difficulties.

SUMMARY OF THE INVENTION

The object of the present invention is the realization of a measurement method and a circuit arrangement which will meet the practical measurement requirements of microwave radio relay equipment and will be free from the above shortcomings (i.e., the realization of extremely pure amplitude modulation, sensitive spectrum analyzer or phase detector, the latter having high AM suppression).

According to this invention a linear two-port network with specific frequency characteristic is utilized to generate an additional amplitude modulation of a phase modulated signal, and the signal proportional to the AM-to-PM conversion to be measured is generated by a simple subtracting circuit. In the following, the main aspects of the invention will be explained in detail.

The invention is based on the fact that a phase modulated carrier transmitted on a network with linear transmission deviations is transformed into a carrier having both amplitude and phase modulations. By cascading the circuit to be measured with the linear network mentioned above, the additional amplitude modulation is reconverted into a phase modulation component which is additive to the input phase modulation already present at the input. Thus, according to the invention, a phase modulated carrier is used to measure the AM-to-PM conversion, hence eliminating the circuit difficulties associated with the generation of high purity amplitude modulation.

According to the present invention, the additional phase modulation is proportional to the product of the AM-to-PM conversion to be measured and the derivative of the frequency response of the linear network mentioned above. Therefore, a circuit having a linear frequency response is a constant quantity. In practice, both the amplitude and the group delay characteristic may be utilized for performing the measurement, thus either a circuit having linear group delay characteristic and constant amplitude characteristic, or a circuit having linear amplitude characteristic and constant group delay characteristic can be applied. According to this invention, different phase relations will exist in the two cases. In the first case, i.e. linear group delay characteristic, the linear circuit will result in an AM which will be in phase with the input PM; and the same phase relation is valid for the additional PM-component resulting from the conversion. Thus, at the phase detector output, the test signal amplitude will be changed by the effect of the conversion. In the second case, i.e. linear amplitude characteristic, the linear circuit will result in an AM and thus also in a PM originating from the conversion to be measured which will be in phase quadrature with the input PM; thus, at the phase detector output, the test signal phase will be changed by the effect of the conversion.

Figure 1:
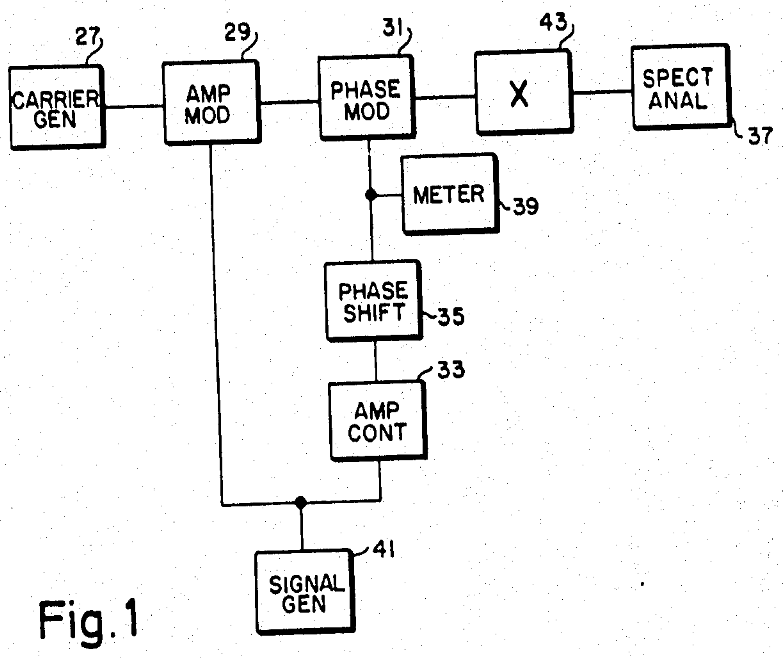
FIG. 1: Block diagram of a known spectrum method of measurement of AM/PM conversion.
Figure 2:
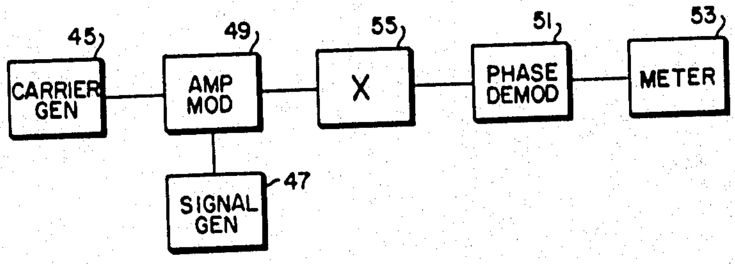
FIG. 2: Block diagram of a known phase detector method of measurement of AM/PM conversion.

According to this invention, the above mentioned low-level additional phase modulation is determined as this modulation is proportional to the AM-to-PM conversion to be measured. According to the measurement set-up, the network having linear transmission deviation is not inserted permanently into the signal path, but is periodically switched in and out between the phase modulated carrier generator and the test item. Thus the additional phase modulation caused by the conversion to be measured will appear as the change of the phase modulation already present. This is indicated by a phase demodulator connected to the test item output; however, there is no requirement to detect a very low-level phase modulation, as in the known method of FIG. 2, but the measurement of the difference in phases is sufficient.

As detailed in the foregoings, this invention is related partly to a method and partly to a circuit arrangement. Both the method and the circuit arrangement have two important versions dependent on the characteristic of the periodically inserted network which may be either a network having linear group delay characteristic or a network having linear amplitude characteristic.

According to the method of this invention, the test item is driven by a carrier signal, modulated in phase by a test tone signal, and this carrier is given along two paths to the input of the test item. In the first half period, the carrier is directly given onto the test item, whereas in the second half period, a network with constant amplitude response and linear group delay response is inserted. This network has the effect of introducing additional amplitude modulation to the original phase modulation, in the same phase as that of the phase modulation. The AM-to-PM conversion of the test item will re-convert this amplitude modulation into phase modulation. Therefore, the signal at the output of the test item is demodulated in phase, and the difference of the test tone amplitudes in the two half periods, proportional to the AM-to-PM conversion to be measured, is produced.

The method as given in the foregoing may be modified in order to increase the sensitivity of the measurement, i.e. to increase the test-tone amplitude change originating from a given AM-to-PM conversion. According to this modified method, networks with constant amplitude and linear group delay responses are inserted in both paths along which the carrier is given onto the test item, the group delay responses of these networks having equal but opposite slope values: i.e., the slope of the network in path No. 1 is positive, and the slope of the network in path No. 2 is negative.

Another version of the method according to the invention is similar to the foregoing, showing, however, the difference of inserting a network with constant group delay and linear amplitude response in the second half period, thus generating an additional amplitude modulation which is in phase quadrature to the original phase modulation. Accordingly, the difference of the test tone phases in the two half periods is formed, as this will be proportional to the AM-to-PM conversion to be measured. The network used in this second version has not only the desirable effect of producing an additional amplitude modulation due to its linear amplitude response, but also the undesirable effect of producing an additional phase modulation due to its constant but non-zero group delay. This undesirable phase modulation would be added to the phase modulation produced by the AM-to-PM conversion to be measured, and thus would result in a measurement error. To eliminate this error, the phase modulated carrier signal is not connected directly to the test item input during the first half period, but through a delay network having a time delay equal to the delay responsible for the undesired phase modulation.

The method as given above may also be modified in order to increase the sensitivity of the measurement. According to this modified method, networks with constant group delay and linear amplitude responses are inserted in both paths, the amplitude responses of these networks again having equal but opposite slope values. The network having the smaller time delay will now be amended to include the delay network as explained above in order to attain equal delays in the two paths.

Figure 3:
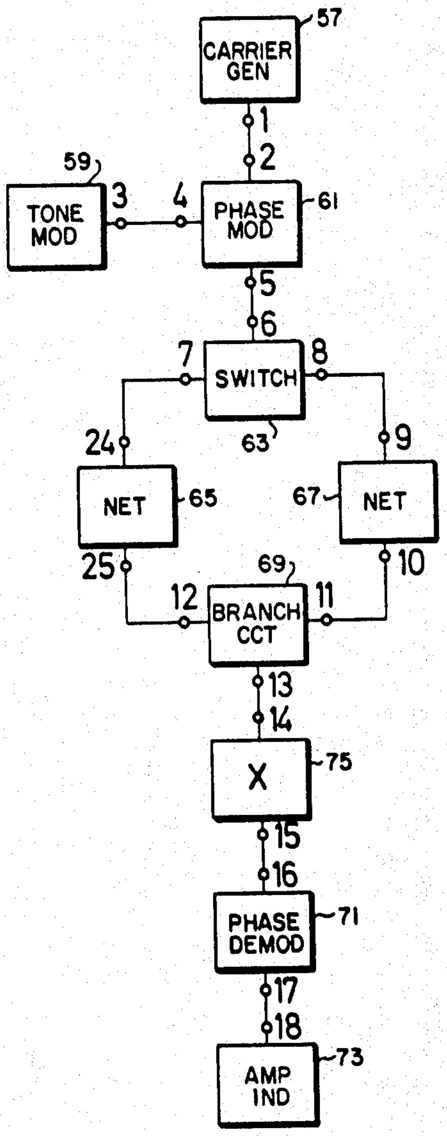
FIG. 3: Block diagram of the AM/PM conversion measurement method according to the invention herein.

The circuit configuration according to this invention and serving for the realization of said method is shown in FIG. 3. The arrangement comprises a carrier phase modulator 61, a test-tone generator 59, a carrier generator 57, a two-position switching circuit 63, networks 65 and 67 having constant amplitude and linear group delay responses, the latters with equal and opposite slope values, a branching circuit 69, a phase demodulator 71 and an amplitude indicator 73. The modulation input 4 of the phase modulator 61 is connected to the output 3 of the test-tone generator 59, and the carrier input 2 is connected to the output 1 of the carrier generator 57. The output 5 of the phase modulator 61 is connected to the input 6 of the two-position switch 63. Outputs 7 and 8 of this switch are connected to the inputs 24 and 9 of networks 65 and 67, respectively, and outputs 10 and 25 of said networks are connected to inputs 11 and 12 of branching circuit 69. Output 13 of this branching circuit 69 feeds input 14 of the test item 75, the conversion of which has to be measured, and the output 15 of test item 75 is connected to the input 16 of phase demodulator 71, with its output 17 connected to the input 18 of the test-tone amplitude indicator 73.

Figure 4:
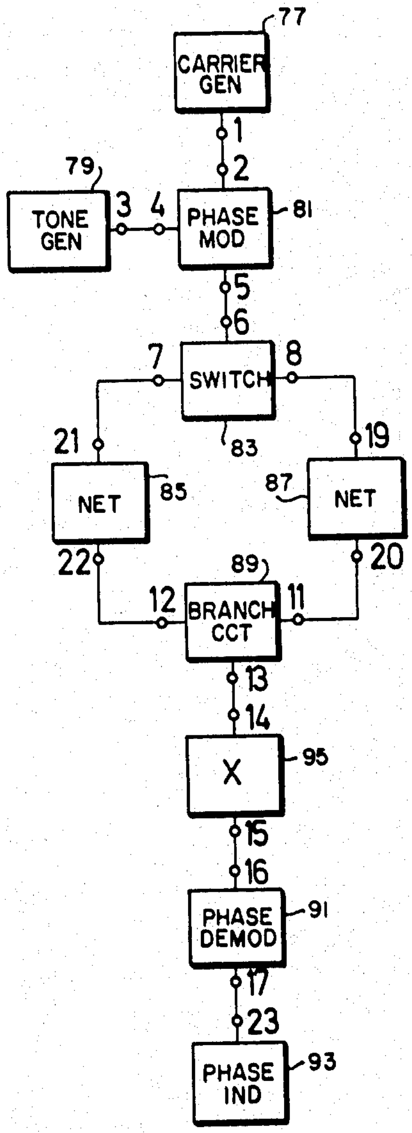
FIG. 4: Block diagram of an alternative AM/PM conversion measurement method according to the invention herein.

A version of the circuit arrangement according to this invention is shown on FIG. 4. This comprises similar circuit elements to those of the circuit in FIG. 3, except the networks 65 and 67 with constant amplitude and linear group delay characteristics shown in FIG. 3.

which in FIG. 4 are substituted by the networks 85 and 87 with constant group delay and linear amplitude characteristics, and except further the amplitude indicator 73 in FIG. 3, which in FIG. 4 is substituted by phase indicator 93.

As may be concluded from the above, the main features of this invention are as follows: a carrier, phase modulated by a test-tone signal, is given on the test item through networks with linear characteristics, inserted periodically, and the change of the test-tone modulation, recovered at the output of a phase demodulator following the test item, and originating from the switching in and out of the networks with linear responses, is indicated. Depending on the phase of the additional PM which may be in phase coincidence or in phase quadrature relative to the phase already present, the change in the test-tone amplitude or the change in the test-tone is indicated.

As related to the application of the method, it is known that in the measurement techniques of PM systems, similar test-tone amplitude-change or phase-change will be produced during the measurement of the so-called differential-gain and differential-phase parameters. Thus, if measuring equipment for the measurement of the differential gain or differential phase parameters is available, this equipment can be made suitable for the AM-to-PM conversion measurement according to this invention by relatively simple means. The equipment for measuring differential characteristics should only be extended to include the networks with linear frequency characteristics, the branching circuit and the two-position switch shown in FIGS. 3 and 4. All further circuits comprised in the circuit arrangements of this invention and shown in FIGS. 3 and 4 are already included in the equipment of the differential gain/phase measuring instrument. This means that the measurement method according to this invention may be economically realized by a relatively simple extension of existing measurement gear.

The version of the circuit arrangement according to this invention comprising networks with linear group delay characteristics having equal but opposite slopes has been realized, with the following numerical data:

| | |
|---|---|
| Phase modulator and phase demodulator carrier frequency | 70 MHz |
| Test tone frequency | 5.6 MHz |
| Phase deviation caused by the test-tone | appr. 0.1 rad |
| Group delay slopes of the networks inserted | +0.33 nsec/MHz and −0.33 nsec/MHz, respectively. |
| AM-to-PM conversion corresponding to a differential gain change of 1%: | 1 °/dB |

We claim:

1. Method for measuring amplitude modulation to phase modulation (AM/PM) conversion of a system under test, including the steps of:

generating a carrier frequency signal;

generating a test-tone signal;

phase modulating the carrier frequency signal in response to the test-tone signal;

applying the modulated carrier frequency signal to the system under test via one and the other of two separate signal channels during periodically alternating time periods, said one channel including a selected transfer function and said other channel having a transfer function including selected group delay and amplitude parameters, where one of said group delay and amplitude parameters is frequency independent and the other is linearly dependent on frequency and the phase-modulated carrier frequency signal is amplitude modulated by the linearly frequency dependent parameter;

demodulating the phase of the carrier frequency signal at the output of the system under test during periodically alternating time periods; and measuring the phase modulation produced in the system under test because of the amplitude modulation of the carrier frequency signal, from the different demodulated test-tone signals obtained during periodically alternating time periods.

2. Method as in claim 1, wherein in the step of applying the modulated carrier signal to the system under test, said other signal channel has a frequency independent amplitude response and a linearly frequency dependent group delay response and the difference in amplitude of the demodulated test-tone signals formed during periodically alternating time periods is measured.

3. Method as in claim 2 wherein in the step of applying the modulated carrier signal to the system under test, said one signal channel provides a direct connection.

4. Method as in claim 2, wherein in the step of measuring, the sensitivity of the measurement is increased by providing said one signal channel also with a frequency independent amplitude response and a linearly frequency dependent group delay response, and the linearly frequency dependent group delay responses of both signal channels have equal but opposite slope values.

5. Method as in claim 1, wherein in the step of applying the modulated carrier signal to the system under test, the phase modulated carrier signal is delayed during one half time period in said one channel and, in the other half time period, is passed via the other signal channel having a frequency independent group delay response and a linearly frequency dependent amplitude response, where the delay of said one signal channel compensates the delay introduced in the other signal channel by the phase modulation due to the frequency independent group delay response, and in the step of measuring, measuring the difference in phase of the demodulated test-tone signals during periodically alternating half periods.

6. Method as in claim 5, wherein in the step of applying the modulated carrier signal to the system under test, said other signal channel also has a frequency independent group delay response and a linearly frequency dependent amplitude response and the linear amplitude responses have equal but opposite slope values.

7. Apparatus for measuring amplitude modulation to phase modulation (AM/PM) conversion comprising:

a carrier frequency oscillator;

a test-tone oscillator;

a phase modulator connected to both oscillators to provide a phase modulated carrier frequency signal;

switching means having an input connected to the phase modulator output for applying said signal at its input in a periodically alternating sequence to each one and another of two signal channels;

said one signal channel having a selected transfer function, and said other signal channel has a transfer function including selected amplitude and group delay parameters, one of said amplitude and group delay parameters being frequency independent, and the other of the parameters being linearly frequency dependent and causing amplitude modulation of the phase modulated carrier frequency signal;

means coupling each of the signal channels to the system under test;

detector means connected to the system under test for responding to the signals applied thereto from the system under test; and measuring means connected to the detector means to measure AM/PM conversion of the system under test from the difference in the demodulated test-tone signals obtained during both periodically alternating time periods.

8. Apparatus as in claim 7 wherein said selected transfer function of said one signal channel has a frequency independent amplitude response and a linearly frequency dependent group delay response and the measuring means measures the difference in amplitude of the demodulated signals obtained during both periodically alternating time periods.

9. Apparatus as in claim 7 wherein said one channel includes a direct connection.

10. Apparatus as in claim 8 wherein said other signal channel also has a transfer function with a frequency independent amplitude response and a linearly frequency dependent group delay response and both group delay responses have equal but opposite slope values.

11. Apparatus as in claim 7 wherein said one signal channel includes delay means and said other signal channel has a frequency independent group delay response and a linearly frequency dependent amplitude response and the delay means compensates for the delay caused by the phase modulation because of the frequency independent group delay response, and the measuring means measures the difference in phase of the test-tone signals obtained during periodically alternating half time periods.

12. Apparatus as in claim 7, wherein said one signal channel has a frequency independent group delay response and a linearly frequency dependent amplitude response and said other signal channel also has a transfer function including a frequency independent group delay response and a linearly frequency dependent amplitude response, and the slope values of the amplitude responses have equal but opposite slope values.

* * * * *

UNITED STATES PATENT OFFICE

CERTIFICATE OF CORRECTION

Patent No. 3,875,512 Dated April 1, 1975

Inventor(s) Andras Baranyi and Tamas Sarkany

It is certified that error appears in the above-identified patent and that said Letters Patent are hereby corrected as shown below:

Column 6, line 48, after "signals" insert -- , measuring --.

Signed and sealed this 17th day of June 1975.

(SEAL)
Attest:

RUTH C. MASON
Attesting Officer

C. MARSHALL DANN
Commissioner of Patents
and Trademarks